US006800669B2

(12) United States Patent
Thoen et al.

(10) Patent No.: US 6,800,669 B2
(45) Date of Patent: Oct. 5, 2004

(54) PROPYLENE COPOLYMER FOAMS

(75) Inventors: Johan A. Thoen, Terneuzen (NL);
Chuiwah A. Cheung, Lake Jackson, TX (US); Bharat I. Chaudhary, Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 143 days.

(21) Appl. No.: 10/021,774

(22) Filed: Dec. 12, 2001

(65) Prior Publication Data

US 2002/0151611 A1 Oct. 17, 2002

Related U.S. Application Data

(60) Provisional application No. 60/257,512, filed on Dec. 22, 2000.

(51) Int. Cl.$^7$ ................ C08J 9/00; C08J 9/14; C08J 9/20
(52) U.S. Cl. .............. 521/144; 521/56; 521/60; 521/79; 521/143
(58) Field of Search ............ 521/56, 60, 79, 521/143, 144, 81, 142

(56) References Cited

U.S. PATENT DOCUMENTS

| | | |
|---|---|---|
| 3,058,944 A | 10/1962 | Breslow et al. |
| 3,203,936 A | 8/1965 | Breslow et al. |
| 3,203,937 A | 8/1965 | Breslow et al. |
| 3,282,864 A | 11/1966 | Bost et al. |
| 3,298,975 A | 1/1967 | Feild et al. |
| 3,336,268 A | 8/1967 | Cox |
| 3,341,480 A | 9/1967 | Feild |
| 3,377,415 A | 4/1968 | Oppenlander |
| 3,389,198 A | 6/1968 | Taber |
| 3,530,108 A | 9/1970 | Oppenlander |
| 3,645,992 A | 2/1972 | Elston |
| 3,687,920 A | 8/1972 | Johnson |
| 3,893,989 A | 7/1975 | Leicht et al. |
| 3,914,342 A | 10/1975 | Mitchell |
| 3,959,425 A | 5/1976 | Herrington |
| 4,003,712 A | 1/1977 | Miller |
| 4,076,698 A | 2/1978 | Anderson et al. |
| 4,113,802 A | 9/1978 | Matteoli et al. |
| 4,200,556 A | 4/1980 | Robinson et al. |
| 4,352,892 A | 10/1982 | Lohmar |
| 4,532,189 A | 7/1985 | Mueller |
| 4,579,905 A | 4/1986 | Krabbenhoft |
| 4,584,347 A | 4/1986 | Harpell et al. |
| 4,694,025 A | 9/1987 | Park |
| 4,714,716 A | 12/1987 | Park |
| 4,820,471 A | 4/1989 | van der Molen |
| 4,916,198 A | 4/1990 | Scheve et al. |
| 5,008,204 A | 4/1991 | Stehling |
| 5,037,895 A | 8/1991 | Maker et al. |
| 5,116,881 A | 5/1992 | Park et al. |
| 5,180,751 A | 1/1993 | Park et al. |
| 5,266,643 A | 11/1993 | Mustonen et al. |
| 5,272,236 A | 12/1993 | Lai et al. |
| 5,278,272 A | 1/1994 | Lai et al. |
| 5,284,613 A | 2/1994 | Ali et al. |
| 5,324,753 A | * 6/1994 | Lesca et al. |
| 5,348,795 A | 9/1994 | Park |
| 5,358,792 A | 10/1994 | Mehta et al. |
| 5,373,236 A | 12/1994 | Tsui et al. |
| 5,414,027 A | 5/1995 | DeNicola, Jr. et al. |
| 5,491,019 A | 2/1996 | Kuo |
| 5,519,785 A | 5/1996 | Hara |
| 5,527,573 A | 6/1996 | Park et al. |
| 5,567,742 A | 10/1996 | Park |
| 5,605,936 A | 2/1997 | DeNicola, Jr. et al. |
| 5,616,627 A | 4/1997 | Sakurai et al. |
| 5,641,848 A | 6/1997 | Giacobbe et al. |
| 5,747,594 A | 5/1998 | deGroot et al. |
| 5,767,033 A | 6/1998 | Imuta et al. |
| 5,844,045 A | 12/1998 | Kolthammer et al. |
| 5,869,575 A | 2/1999 | Kolthammer et al. |
| 5,883,151 A | 3/1999 | Raetzsch et al. |
| 6,103,833 A | 8/2000 | Hogt et al. |
| 6,143,829 A | 11/2000 | Babb et al. |
| 6,143,854 A | 11/2000 | Bamberger et al. |
| 6,207,754 B1 | 3/2001 | Yu |
| 6,211,302 B1 | 4/2001 | Ho et al. |
| 6,417,242 B1 | * 7/2002 | Hughes et al. |

FOREIGN PATENT DOCUMENTS

| | | |
|---|---|---|
| CA | 797 917 | 10/1968 |
| CA | 1 024 296 | 1/1978 |
| CA | 1 219 389 | 3/1987 |
| DE | 1 569 025 | 7/1970 |

(List continued on next page.)

OTHER PUBLICATIONS

R. A. Abramovitch, Polar Radicals in Aromatic Substitution, *Intra–Science Chemistry Reports*, pp. 211–218, 1969.

R. A. Abramovitch et al., "Reaction of Sulphonyl Azides with Unstrained Olefins", *J. Chem. Soc.*, pp. 2169–2172, 1974.

(List continued on next page.)

Primary Examiner—Morton Foelak

(57) ABSTRACT

A foam comprising a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, process for making a foam using such a propylene copolymer material, process for making a foam in the form of thermoplastic foam beads using such a propylene copolymer material, and an expandable composition comprising such a propylene copolymer material.

13 Claims, No Drawings

FOREIGN PATENT DOCUMENTS

| | | |
|---|---|---|
| EP | 0 351 208 | 1/1990 |
| EP | 0 474 376 | 3/1992 |
| EP | 0 595 252 | 5/1994 |
| EP | 0 702 032 | 3/1996 |
| EP | 0 747 376 | 5/1996 |
| EP | 0 634 454 | 11/1997 |
| EP | 0 625 545 | 1/1998 |
| EP | 0 634 441 | 5/1998 |
| EP | 0 872 517 | 10/1998 |
| GB | 1 080 619 | 8/1967 |
| GB | 2 205 103 A | 11/1988 |
| JP | 46-31756 | 9/1971 |
| JP | 50-133248 | 10/1975 |
| WO | 93/04486 | 3/1993 |
| WO | 96/07681 | 3/1996 |
| WO | 96/20247 | 7/1996 |
| WO | 97/20888 | 6/1997 |
| WO | 97/20889 | 6/1997 |
| WO | 99/10415 | 3/1999 |
| WO | 99/10424 | 3/1999 |
| WO | 99/10426 | 3/1999 |
| WO | 00/02960 | 1/2000 |
| WO | 00/02961 | 1/2000 |
| WO | 00/52091 | 9/2000 |
| WO | 00/53669 | 9/2000 |
| WO | 00/78858 | 12/2000 |
| WO | 00/78861 | 12/2000 |

OTHER PUBLICATIONS

R. A. Abramovitch et al., Intramolecular Insertion of Arylsulfonylnitrenes into Aliphatic Side Chains, *J. Org. Chem.*, vol. 42, No. 17, pp. 2920–2926, 1977.

R. A. Abramovitch et al., Pyrolysis of Phenylaikylsulphonyl Azides and 2–phenethyl Azidofomate. Selectivity of Sulphonylnitrenes And Contrast between Sulphonyl–and Carbonyl–nitrenes, *J. Chem. Soc. Chem Commun.*, pp. 1087–1088, 1981.

R. A. Abramovitch et al., "Reaction of Aromatic Sulfonyl Azides with Dienes", *J. Org. Chem.*, vol. 46, pp. 330–335, 1981.

H. Radusch et al., "Chemical coupling of polystyrene and polybutadiene in melt mixtures by using an organic sulfonylazide", *Die Angewandte Makromolekulare Chemie*, vol. 204, pp. 177–189, 1993.

N. Takashima et al., "The Processings of Crosslinked Plastics", *Kogaku Kogyo* (*Chemical Industry*), pp. 378–383, 1969.

D. S. Breslow et al., "Thermal Reactions of Sulfonyl Azides", *J. Amer. Chem. Soc.*, vol. 91, pp. 2273–2279, 1969.

Derwent Chemical Abstract No. 1977–88691Y for JP 50–133248.

M. Xanthos, "Interfacial Agents of Multiphase Polymer systems: Recent Advances", *Polymer Engineering and Science*, vol. 28, pp. 1392–1400, 1988.

K. A. Chaffin et al., "Semicrystalline Blends of Polyethylene and Isotactic Polypropylene: Improving Mechanical Performance by Enhancing the Interfacial Structure", *Journal of Polymer Science: Part B: Polymer Physics*, vol. 38, pp. 108–121, 2000.

E. P. Moore, *Polypropylene Handbook*, pp. 15–45, 1996.

E.P. Moore, *Polypropylene Handbook*, p. 220, 1996.

E.P. Moore, *Polypropylene Handbook*, pp. 330–332, 1996.

Han and Shetty, "Studies on Multilayer Film Coextrusion III. The Rheology of Blown Film Coextrusion", *Polymer Engineering and Science*, vol. 18, No. 3, pp. 187–199, 1978.

Inoue, "Selective Crosslinking in Polymer Blends. I. Novel Selective Crosslink Systems for Polypropylene/Unsaturated Elastomer Blends", *Journal of Applied Polymer Science*, vol. 54, pp. 709–721, 1994.

Inoue, "Selective Crosslinking in Polymer Blends. II. Its Effect on Impact Strength and Other Mechanical Properties of Polypropylene/Unsaturated Elastomer Blends", *Journal of Applied Polymer Science*, vol. 54, pp. 723–733, 1994.

Inoue and Suzuki, "Selective Crosslinking Reaction in Polymer Blends. III. The Effects of the Crosslinking of Dispersed EPDM Particles on the Impact Behavior of PP/EPDM Blends", *Journal of Applied Polymer Science*, vol. 56, pp. 1113–1125, 1995.

Derwent Chemical Abstract No. 77–02552Y of JP 51134762A.

U.S. patent application Ser. No. 09/133,576 filed Aug. 13, 1998 (43324A), Craig Silvis et al., "In–Situ Rhelogy Modification of Polyolefins".

\* cited by examiner

PROPYLENE COPOLYMER FOAMS

This application claims the benefit of U.S. Provisional Application No. 60/257,512, filed Dec. 22, 2000. This invention relates to foams of propylene copolymers.

BACKGROUND

The production of foams from propylene polymers is hampered by the low melt viscosity and melt elasticity of these polymers. While attempting to use standard propylene resins for making foams this usually results in a lack of stability of the foam bubbles or foam cell walls and consequently collapsed or poor quality foams.

DeNicola et al. disclose in U.S. Pat. No. 5,605,936 that propylene polymers of increased melt strength can be obtained by irradiation of the polymers. However, when such polymers are blended with elastomers to obtain better impact strength, the melt strength suffers. Irradiation of heterophasic (or impact) resins by conventional radiation methods yielded improved melt strength resins but resulted in severe gelation and high degree of crosslinking occurs which are undesirable in foaming applications (column 1, lines 42–58 and Control Examples 6–8). DeNicola et al. suggest to provide foams from a composition of three different components, including high levels (30–80 weight percent) of ethylene-propylene copolymers elastomer which blend is typically subjected to irradiation.

In U.S. Pat. No. 5,348,795 Park discloses open-cell foams of low density which are dimensionably stable and typically prepared from high melt strength propylene homopolymers or high melt strength propylene random copolymers.

In co-pending U.S. patent application Ser. No. 09/133,576 filed Aug. 13, 1998 and WO-99/10424 in-situ rheology modification of polyolefins is disclosed as applied to, among others, polypropylenes and blends of polypropylenes with elastomers resulting in polypropylenes having advantageous melt processing properties. Foams are mentioned among the possible end uses or applications of such rheology-modified propylene polymers. However, there is no further specific teaching on materials suitable for foams or foam properties.

There is still a demand for foams which are non-brittle and have good low temperature cushioning properties. It is also desirable to produce such foams using uncomplicated foaming processes and equipment.

SUMMARY OF THE INVENTION

The invention in one aspect provides a foam comprising a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s.

In addition there is provided a process for making a foam, which process comprises converting a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, into a polymer melt, introducing, at an elevated pressure, at least one blowing agent into the polymer melt to form a foamable gel, cooling the foamable gel, and extruding the foamable gel into a region of lower pressure to form a foam.

According to a further aspect the invention provides a process for making a foam in the form of thermoplastic foam beads, which process comprises converting a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, into a polymer melt, cooling and granulating the polymer melt to form discrete resin particles, creating a suspension by dispersing the resin particles in a liquid medium in which they are substantially insoluble, introducing, at an elevated temperature and pressure, at least one blowing agent into the suspension to form resin particles having a blowing agent incorporated therein, and rapidly discharging the product into an atmosphere that promotes converting the product into foam beads.

Further the invention provides an expandable composition comprising a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, and a blowing agent.

DETAILED DESCRIPTION OF THE INVENTION

As used herein the terms "melt strength" and "drawability" refer to polymer melt properties and are measured at 190° C. according to the following procedure. Measure melt strength by using a capillary rheometer fitted with a 2.1 mm diameter, 20:1 die with an entrance angle of approximately 45 degrees. After equilibrating the samples at 190° C. for 10 minutes, run the piston at a speed of 2.54 cm/min (1 inch/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test (at break) is defined as the melt strength and is expressed in centiNewtons (cN). The limiting wheel velocity at break is the melt drawability and reported in units of mm/s. In the case of a polymer melt exhibiting draw resonance, the tensile force and wheel velocity before the onset of draw resonance was taken as the melt strength and drawability, respectively.

As used herein the term "melt flow rate" refers to the melt flow rate of the polymer measured according to method ASTM D 1238L, at a temperature of 230° C. under a weight of 2.16 kg and is expressed in g/10 min.

Resin (polymer) density was determined by ASTM D-792, employing Archimede's buoyancy displacement principal.

Gel Content was determined by xylene extraction—ASTM D-2765 Procedure "A" to measure the degree of crosslinking of the polymer. Samples were immersed in xylene to extract what was not a gel (or crosslinked). After extraction, the sample was then dried and weighed. The resulting data was converted to percent gel.

The propylene copolymer material used in foams of the present invention comprises at least 50 weight percent of units derived from propylene, based on the total propylene polymer, and units derived from ethylenically unsaturated comonomers, said propylene copolymer material having a melt flow rate in the range of from 0.5 to 8 g/10 min, a melt strength of at least 5 cN, and a melt drawability of at least 20 mm/s. Preferably, the propylene copolymer material has a melt flow rate in the range of from 0.6 to 5 g/10 min, a melt strength of at least 7 cN, and a melt drawability of at least 30 mm/s, more preferably a melt flow rate in the range of from 0.6 to 3.5 g/10 min, a melt strength of at least 10 cN, and a melt drawability of at least 40 mm/s. The current copolymer materials have a relatively better processability, i.e. a higher melt flow rate, at the same melt strength and thus foams can be produced from the copolymer materials at higher production rates than possible with prior art materials. At melt flow rates below the lower limit relatively high amounts of energy are required for producing the foam materials, thus resulting in higher production cost.

The propylene copolymer material used in foams of the present invention generally has a Rockwell hardness as measured according to DIN 50103 of less than 90 HRC, and more preferably less than 85 HRC.

The ethylenically unsaturated comonomer of the propylene copolymer material preferably is selected from the group consisting of ethylene, $C_4$–$C_{10}$ 1-olefins, and $C_4$–$C_{10}$ dienes. The propylene copolymer material in the present foams preferably comprises a propylene random copolymer. Alternatively, the propylene copolymer material preferably comprises a continuous phase of a propylene homopolymer or of a random or block propylene copolymer and uniformly dispersed therein an elastomeric phase. This latter material is also referred to as a heterophasic or impact copolymer. The propylene copolymer material preferably is a rheology modified propylene copolymer material.

As used herein, the term "rheology modification or modified" means change in the resistance of the molten polymer to flow. The resistance of polymer melts to flow is indicated by (1) the tensile stress growth coefficient and (2) the dynamic shear viscosity coefficient. The tensile stress growth coefficient $_{E+}$ is measured during start-up of uniaxial extensional flow by means within the skill in the art such as is described by J. Meissner in Proc. XIIth International Congress on Rheology, Quebec, Canada, August 1996, pages 7–10 and by J. Meissner and J. Hostettler, Rheol. Acta, 33, 1–21 (1994). The dynamic shear viscosity coefficient is measured with small-amplitude sinusoidal shear flow experiments by means within the skill in the art such as described by R. Hingmann and B. L. Marczinke, J. Rheol. 38(3), 573–87, 1994.

Known methods for rheology modification include irradiation treatment or chemical treatment with coupling or branching agents or a combination of such treatments. The preferred process to produce the rheology modified propylene polymer material involves coupling of the polymer material using a coupling agent. The coupling reaction is implemented via reactive extrusion or any other method which is capable of mixing the coupling agent with the polymer material and adding sufficient energy to cause a coupling reaction between the coupling agent and the polymer material. Preferably, the process is carried out in a single vessel such as a melt mixer or a polymer extruder, such as described in U.S. patent application Ser. No. 09/133,576 filed Aug. 13, 1998 (corresponding to WO-99/10424) which claims the benefit of U.S. Provisional Application No. 60/057,713 filed Aug. 27, 1997, both of which are incorporated by reference herein in their entity. The term extruder is intended to include its broadest meaning and includes such devices as a device which extrudes pellets as well as an extruder which produces the extrudate for forming into films, blow molded articles, profile and sheet extruded articles, foams and other articles. The polymer resulting from this preferred rheology modification is a "coupled polymer" resulting from a coupling reaction. A coupled polymer differs from a crosslinked polymer in that the coupled polymer is thermoplastic and has a low gel level.

Other less preferred rheology modification treatments are disclosed for example in U.S. Pat. Nos. 4,714,716, 4,916,198, 5,883,151, 5,266,643 and 5,929,127 (which are incorporated by reference herein in their entirety). Combinations of rheology modification treatments may be used as well.

Advantageously, the propylene copolymer materials used for producing foams according to the present invention are obtained by rheology modifying and preferably coupling known propylene random copolymer or propylene impact copolymers to provide propylene copolymer materials having the desired properties.

Random copolymers suitable for rheology modification include a copolymer of propylene and one or more olefins selected from the group consisting of ethylene, $C_4$–$C_{10}$ 1-olefins, and $C_4$–$C_{10}$ dienes, provided that, when said olefin is ethylene, the maximum polymerized ethylene content is less than about 20% by weight, when said olefin is a $C_4$–$C_{10}$ 1-olefin, the maximum polymerized content thereof is less than about 20% by weight and when said olefin is a $C_4$–$C_{10}$ diene, the maximum polymerized content thereof is less than about 20% by weight. More preferably, the random copolymer is an ethylene-propylene random copolymer having from 1 to 10 weight percent units derived from ethylene, most preferably the random copolymer is an ethylene-propylene random copolymer having from 1 to 5 weight percent units derived from ethylene.

Propylene impact copolymers suitable for rheology modification include polymeric materials where a propylene homopolymer or a propylene random or block copolymer is the continuous phase and an elastomeric phase is uniformly dispersed therein. Those of skill in the art recognize that this elastomeric phase may also contain crystalline regions, which for purposes of the current invention are considered part of the elastomeric phase. The propylene impact copolymers may be prepared by an in-reactor process or by physically blending of its constituents. In a preferred embodiment the propylene impact copolymers are formed via in-reactor blending, advantageously in a dual or multistage process, which optionally involves a single reactor with at least two process stages taking place therein, or optionally multiple reactors. The in-reactor-produced impact copolymers are preferred since no separate physical blending step is required and a relatively better and finer distribution of elastomer in the continuous phase is obtained more easily and at lower energy cost.

The propylene random and impact copolymers to be used for rheology modification are commercially available and are well known within the skill in the art, for instance, as described by E. P. Moore, Jr in *Polypropylene Handbook*, Hanser Publishers, 1996, pages 98–98, pages 211–222 and pages 244–249 and U.S. Pat. Nos. 3,893,989 and 4,113,802.

Advantageously, the propylene impact copolymer to be rheology modified has at least about 5 weight percent, preferably at least about 9 weight percent, more preferably at least about 13 weight percent, of an elastomeric phase based on the total weight of the impact propylene copolymer. Preferably, the elastomeric phase is less than about 45 weight percent, more preferably less than about 40 weight percent, most preferably less than about 38 weight percent, of the total weight of the propylene impact copolymer. A higher elastomer content lowers the ductile-to-brittle transition point to lower temperatures and further increases the impact properties.

When the continuous phase of the propylene impact copolymer is a homopolymer propylene polymer and the elastomeric phase is comprised of a copolymer or terpolymer containing monomer units derived from ethylene, the impact propylene copolymer preferably contains at least about 5 weight percent, more preferably at least about 7 weight percent, most preferably at least about 9 weight percent —$CH_2CH_2$-units derived from ethylene monomer based on the total weight of the impact propylene copolymer. Preferably, such an impact propylene copolymer contains less than about 30 weight percent, more preferably less than about 25 weight percent, most preferably less than about 20 weight percent —$CH_2CH_2$-units derived from ethylene monomer based on the total weight of the propylene impact copolymer. Most preferably, this propylene impact copolymer is an in-reactor-produced material.

The continuous phase of the propylene impact copolymers typically is a propylene homopolymer or a propylene random copolymer, more typically a homopolymer propylene polymer. The propylene polymer may be made using Ziegler-Natta catalyst, constrained geometry catalyst, metallocene catalyst, or any other suitable catalyst system. When the propylene polymer making up the continuous phase is a propylene homopolymer, the crystallinity of the propylene polymer, as determined by differential scanning calorimetry, is preferably at least about 50 percent, more preferably at least about 55 percent, most preferably at least about 62 percent. The methods for determining percent crystallinity using a differential scanning calorimetry are known to one of skill in the art, for instance, as described by E. P. Moore, Jr in *Polypropylene Handbook,* Hanser Publishers, 1996, pages 124–128. The propylene impact copolymer is characterized by an impact strength (ASTM D256, Notched Izod Impact, 23 C) of at least 60 J/m, preferably at least 80 J/m and most preferably at least 100 J/m.

According to the preferred rheology modification treatment, the coupling treatment, a propylene random copolymer or propylene impact copolymer is reacted with a polyfunctional compound capable of insertion reactions into C—H bonds. Such polyfunctional compounds have at least two, preferably 2, functional groups capable of forming reactive groups, which are capable of C—H insertion reactions. Those skilled in the art are familiar with C—H insertion reactions and reactive groups capable of such reactions. For instance, carbenes as generated from diazo compounds, as cited in Mathur, N. C.; Snow, M. S.; Young, K. M., and Pincock, J. A.; *Tetrahedron,* (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.,* (1977), 42(17), 2920–6, and Abramovitch, R. A., Knaus, G. N., *J. Org. Chem.,* (1975), 40(7), 883–9.

Compounds having at least two functional groups capable of forming reactive groups, which are capable of C—H insertion under reaction conditions, are referred to herein as coupling agents. Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides ($R_2$—P(O)—$N_3$) and silyl azides ($R_3$—Si—$N_3$). Preferably, the coupling agent is a poly (sulfonyl azide). U.S. patent application Ser. No. 09/133,576 filed Aug. 13, 1998 and WO 99/10424 published Mar. 4, 1999 contain additional teaching regarding azides and their use for modifying polymers.

When the poly(sulfonyl azide) reacts with the propylene polymer resin, at least two separate propylene polymer chains are advantageously joined and the molecular weight of the polymer chain is increased. In the preferred case when the poly(sulfonyl azide) is a bis(sulfonyl azide) (hereinafter "BSA"), two propylene polymer chains are advantageously joined.

The poly(sulfonyl azide) is any compound having at least two sulfonyl azide groups (—$SO_2N_3$) reactive with the propylene polymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes. The term inertly substituted refers to substitution with atoms or groups which do not undesirably interfere, at the coupling reaction conditions, with the desired reaction(s) or desired properties of the resulting coupled polymers. Such groups include fluorine, aliphatic or aromatic ether, siloxane as well as sulfonyl azide groups when more than two propylene polymer chains are to be joined. R is suitably aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl) azides include such compounds as 1,5-pentane bis (sulfonylazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis (4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

The following discussion regarding the coupling reaction mechanism provides the inventors current theories but is not intended to limit the scope of this invention. Sulfonyl azides decompose in several ways, but for the practice of the invention, the reactive species, believed to be the singlet nitrene, as evidenced by insertion into C—H bonds is desired. Thermal decomposition is reported to give an intermediate singlet sulfonyl nitrene, which will react readily by insertion into carbon-hydrogen bonds. The high temperatures necessary for efficient formation of the sulfonyl nitrene is usually greater than about 150° C. When BSA such as, 4,4'-Oxydibenzenesulfonyl azide (DPO-BSA) is used for the coupling agent, polymer stream temperatures of greater than 250° C. are preferably avoided while there is significant unreacted azide in the reaction mixture.

The poly(sulfonyl azide) is preferably mixed with the propylene polymer before the resulting mixture is heated to the decomposition temperature of the poly(sulfonyl azide). By decomposition temperature of the poly(sulfonyl azide) is meant that temperature at which a substantial percentage of the azide is converted to the sulfonyl nitrene, eliminating nitrogen and more heat in the process. The decomposition temperature may be determined by differential scanning calorimetry (DSC). For instance, a differential scanning calorimeter (DSC) thermogram of the DPO-BSA shows no change in the heat flow until a sharp endothermic melting peak is observed at 100° C. The baseline is flat again (no heat flow) until a broad exothermic peak is observed that begins about 150° C., peaks at 185° C. (referred to herein as the peak decomposition temperature) and is complete by 210° C. The total amount of energy released due to decomposition of the sulfonyl azide groups is about 1500 Joules/gram. Preferably, the poly(sulfonyl azide) is heated to at least the peak decomposition temperature. The poly(sulfonyl azides) used advantageously have a peak decomposition temperature greater than about 150° C., preferably greater than about 160° C., more preferably greater than about 180° C.

The amount of poly(sulfonyl azide) is preferably at least about 50 parts per million by weight (ppm), more preferably at least about 75 ppm, most preferably at least about 100 ppm, and in some instances, preferably at least about 150 ppm. In the practice of the invention, formation of crosslinked networks to an extent that would result in intractable propylene polymer is to be avoided; therefore, poly(sulfonyl azide) is preferably limited to that amount which results in chain coupled or rheology modified (but not substantially crosslinked) propylene polymer, preferably less than about 2000 ppm, more preferably less than about 1500 ppm, most preferably less than about 1300 ppm poly(sulfonyl azide) based on the total weight of propylene polymer. Substantial crosslinking is characterized by the presence of gels of sufficient size or weight percentage such that the processing of the film is detrimentally affected. Such detrimental effects include increased operating amperage, discontinuities in or undispersed materials in the film, increased back pressure, and/or, partial die plugging due to gels or black specs. The amount to be used depends on the melt flow rate of the starting and targeted propylene polymers and can be determined by the skilled person.

The propylene random or impact copolymer and coupling agent are suitably combined in any manner which results in desired reaction thereof, preferably by mixing the coupling agent with the polymer under conditions which allow sufficient mixing before or during reaction to avoid unnecessary or undesirably uneven amounts of localized reaction. An undesirable amount is an amount that interferes with the purpose of the final product. In a preferred embodiment the process of the present invention takes place in a single vessel, that is mixing of the coupling agent and polymer takes place in the same vessel as heating to the decomposition temperature of the coupling agent. The vessel is most preferably a twin-screw extruder, but preferably a single-screw extruder or advantageously a melt mixer, including a batch mixer. The reaction vessel more preferably has at least two zones of different temperatures into which a reaction mixture would pass.

In the most preferred embodiment, the propylene copolymer and the coupling agent are physically mixed at a temperature that is low enough to minimize the reaction between the coupling agent and the polymer. Such physical mixing can occur in any equipment, such as V-blenders, ribbon or paddle blenders, tumbling drums, or extruders, which will mix the coupling agent and the propylene polymer. The term extruder is used for its broadest meaning to include such devices as a device which extrudes pellets as well as an extruder which produces the extrudate for forming into articles, such as a film.

Preferably, this physical mixing occurs in the early stages of an extruder, most preferably a twin screw extruder. In particular, this embodiment may be practiced by simultaneously introducing the propylene polymer resin and the coupling agent into the feed section of an extruder. The extruder is configured to have a first section that physically mixes and conveys the coupling agent and polymer in a manner that minimizes the reaction between the coupling agent and the polymer. The conveying first section is followed by at least a second section where the coupling agent and polymer are rapidly further mixed and sufficient heat is added to cause significant reaction between the coupling agent and polymer.

In another embodiment, the mixing is preferably attained with the polymer in a molten or at least partially melted state, that is, above the softening temperature of the polymer, or in a dissolved or finely dispersed condition rather than in a solid mass or particulate form. Any mixing equipment is suitably used in this embodiment, preferably equipment which provides sufficient mixing and temperature control in the same equipment, but advantageously practice of this embodiment takes place in such devices as an extruder, melt mixer, pump conveyor or a polymer mixing devise such as a Brabender melt mixer. While it is within the scope of this embodiment that the reaction takes place in a solvent or other medium, it is preferred that the reaction be in a bulk phase to avoid later steps for removal of the solvent or other medium.

Melt phase mixing is advantageous for forming a substantially uniform admixture of coupling agent and polymer before exposure to conditions in which chain coupling takes place. Conveniently for this embodiment, the formation of a substantially uniform admixture occurs along a temperature profile within equipment such as an extruder. The first zone is advantageously at a temperature at least the softening temperature of the polymer(s) and preferably less than the decomposition temperature of the coupling agents and the second zone being at a temperature sufficient for decomposition of the coupling agent. Especially in the case of propylene polymers, most preferably the propylene polymer(s) and coupling agent are exposed to a profile of melt stream temperatures ranging from about 160° C. to about 250° C.

Those skilled in the art recognize that a polymer, or mixture thereof, typically melts over a range of temperatures rather than melting sharply at one temperature. For the practice of this embodiment, it is sufficient that the polymer be in a partially melted state. For convenience, the temperature of this degree of melting can be approximated from the differential scanning calorimeter (DSC) curve of the polymer or mixture thereof to be treated.

Conveniently, when there is a melt extrusion step between production of the copolymer material and its use, at least one step of the process of the invention takes place in the melt extrusion step. The heat produced during the extrusion step provides the energy necessary to cause the reaction between the coupling agent and the target polymer.

For all embodiments, a temperature of at least the decomposition temperature of the coupling agent is preferably maintained for a time sufficient to result in decomposition of at least sufficient coupling agent to avoid later undesirable reaction, preferably at least about 80, more preferably at least about 90, most preferably at least about 95 weight percent of the coupling agent is reacted. Those skilled in the art realize that this time is dependent on whether the temperature is one at which the coupling agent slowly decomposes or one at which it very rapidly decomposes. Preferably, the time will be at least about 5 seconds, more preferably at least about 10 seconds to avoid unreacted coupling agent, and subsequent undesirable reactions, or to avoid the need for inconveniently, possible destructively high temperatures. Conveniently, the reaction time is about 20 seconds.

Other thermoplastic polymers may be blended with the propylene polymers provided the desired foam properties are achieved. Examples of these include high-and low-density polyethylenes, ethylene-vinyl aromatic interpolymers, polybutene-1, ethylene-vinyl acetate copolymer, ethylene-propylene rubber, styrene-butadiene rubber, ethylene-ethyl acrylate copolymer and the like, that may be mixed into the above-mentioned propylene polymer, so long as the latter is the main component in the resulting mixture and the mixture is of uniform quality.

The blends may be prepared by any suitable means known in the art such as, for example, dry blending in a pelletized form in desired proportions followed by melt blending in an apparatus such as a screw extruder or a Banbury mixer. Dry blended pellets may be directly melt processed into a final solid state foam. The blends may also be made by direct polymerization without isolating blend components. Direct polymerization may use, for example, one or more catalysts in a single reactor or two or more reactors in series or parallel and vary at least one of operating conditions, monomer mixtures and catalyst choice.

Various additives may optionally be incorporated into the compositions or foams of the present invention. The additives include, without limitation, stability control agents, nucleating agents, inorganic fillers, conductive fillers, pigments, colorants, antioxidants, acid scavengers, ultraviolet absorbers or stabilizers, flame retardants, processing aids, extrusion aids, anti-static agents, cling additives (for example, polyiso-butylene), antiblock additives, other thermoplastic polymers. Certain of the additives, such as inorganic and conductive fillers, may also function as nucleating agents and/or open cell promoters for foams. Examples of antioxidants are hindered phenols (such as, for example, Irganox™ 1010) and phosphites (for example, Irgafos™ 168) both trademarks of, and commercially available from, Ciba Geigy Corporation.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.02 to 5, more preferably from 0.03 to 2 percent by weight based upon the weight of the polymer or polymer blend. Similarly, the amounts of any of the other enumerated additives are the functionally equivalent amounts.

The polymer compositions described above may be converted to foam products using any conventional process. Foam products include, for example, extruded thermoplastic polymer foam, extruded polymer strand foam, expandable thermoplastic foam beads, expanded thermoplastic foam beads or expanded and fused thermoplastic foam beads, and various types of crosslinked foams. The foam products may take any known physical configuration, such as sheet, round, strand geometry, rod, solid plank, laminated plank, coalesced strand plank, profiles and bun stock. The foam products may be converted into fabricated articles using any conventional process or method. For example, any one or more of expansion, coalescing and welding may be used in making such articles, especially from expandable foam beads. One may also mold expandable beads into any known configuration that employs foam products, including, but not limited to the foregoing configurations.

Foam forming steps of the process are known in the art. For instance as exemplified by the teachings to processes for making ethylenic polymer foam structures and processing them in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

Foams of the present invention may be substantially noncrosslinked. That is, the foam structure contains 50 or less, preferably 40 or less, more preferably 30 or less, even more preferably 20 or less, most preferably 10 or less weight percent gel based upon the total weight of foam or polymer, as measured according to ASTM D-2765-84, Method A.

Alternatively, the polymer compositions could be used to make foams which are substantially cross-linked (that is, contain greater than 50 weight percent gel based upon the total weight of polymer, as measured according to ASTM D-2765-84 Method A) by further addition of any known cross-linking agent. The various crosslinking agents and technologies technologies are described in the art. Cross-linking may be induced by addition of a cross-linking agent. Induction of cross-linking and exposure to an elevated temperature to effect foaming or expansion may occur simultaneously or sequentially. If a chemical cross-linking agent is used, it is incorporated into the polymer material in the same manner as the chemical blowing agent. Further, if a chemical cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The foam and foam structures of the present invention are optionally made by a conventional extrusion foaming process. The structure is advantageously prepared by heating the copolymer material or blend to form a plasticized or melt polymer material, incorporating therein a blowing agent to form a foamable gel, and extruding the gel through a die to form the foam product. Depending upon the die (with an appropriate number of apertures) and operating conditions, the product may vary from an extruded foam plank or rod through a coalesced foam strand product, to foam beads and eventually to chopped strands of foamable beads. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt copolymer material and to advantageously disperse the blowing agent homogeneously therein. Optionally, a nucleator is optionally blended in the polymer melt or dry blended with the polymer material prior to plasticizing or melting. Prior to extruding foamable gel through the die, one typically cools the gel to an optimum temperature. The foamable gel is typically cooled to a lower temperature to optimize physical characteristics of the foam structure. This temperature, often referred to as the foaming temperature, is typically above each component's polymer glass transition temperature ($T_g$), or for those having sufficient crystallinity, near the peak crystalline melting temperature ($T_m$). "Near" means at, above, or below and largely depends upon where stable foam exists. The temperature desirably falls within 30° C. above or below the $T_m$ and preferably within 10° C. above or below the $T_m$. For foams of the present invention, an optimum foaming temperature is in a range in which the foam does not collapse. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level. The preferred foam forming window for the elastomer containing propylene copolymer materials is from 142 to 162° C., more preferably from 152 to 162° C.

In another embodiment, the resulting foam structure is optionally formed in a coalesced strand form by extrusion of the polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720.

Alternatively, the resulting foam structure is conveniently formed by an accumulating extrusion process and apparatus as seen in U.S. Pat. Nos. 4,323,528 and 5,817,705. This apparatus, commonly known as an "extruder-accumulator system" allows one to operate a process on an intermittent, rather than a continuous, basis.

The present foam structures may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in Plastic Foams, Part II, Frisch And Saunders, pp. 544–585, Marcel Dekker, Inc. (1973) and Plastic Materials, Brydson, 5th Ed., pp. 426–429, Butterworths (1989). Expandable and expanded beads can be made by a batch or by an extrusion process, and may be substantially non-crosslinked or substantially crosslinked.

The batch process of making expandable beads is similar to manufacturing expandable polystyrene (EPS). The resulting foam structure is formed into non-crosslinked foam beads suitable for molding into articles. Discrete resin particles, such as granules made from the propylene copolymer material, made either by melt blending or preferably by in-reactor blending, are impregnated with a blowing agent in an aqueous suspension or in an anhydrous state in a pressure vessel at an elevated temperature and pressure. In the case of the aqueous supsension, the blowing agent is/are introduced into the liquid medium in which the granules are substantially insoluble (such as water) at an elevated pressure and temperature in an autoclave or other pressure vessel. The granules are either discharged rapidly into an atmosphere or a region of reduced pressure to expand the granules into foam beads or cooled and discharged as unexpanded beads. In a separate step, the unexpanded beads are heated to expand them, for example, with steam or with hot air. This process for making bead foams is well taught in U.S. Pat. Nos. 4,379,859 and 4,464,484.

The foam beads can also be prepared by preparing a mixture of the polymer blend compositions of the present invention, optionally cross-linking agent, and chemical blowing agent in a suitable mixing device or extruder and form the mixture into pellets, and heat the pellets and expand and optionally cross-link.

In another process for making cross-linked foam beads suitable for molding into articles, the blends of this invention are melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, above publication, pp. 224–228.

The foam beads may be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may optionally be heated prior to charging. The foam beads are conveniently then molded to blocks or shaped articles by a suitable molding method known in the art. Some of the methods are taught in U.S. Pat. Nos. 3,504,068 and 3,953,558. Excellent teachings of the above processes and molding methods are seen in C. P. Park, supra, p. 191, pp. 197–198, and pp. 227–233, U.S. Pat. Nos. 3,886,100, 3,959,189, 4,168,353 and 4,429,059.

Blowing agents useful in making the foam structures of the present invention include inorganic agents, organic blowing agents and chemical blowing agents. Suitable inorganic blowing agents include carbon dioxide, nitrogen, argon, water, air, oxygen, sulfur hexafluoride ($SF_6$) and helium. Organic blowing agents include aliphatic hydrocarbons having 1–9 carbon atoms, aliphatic alcohols having 1–3 carbon atoms, ketones, and fully and partially halogenated aliphatic hydrocarbons having 1–4 carbon atoms. Aliphatic hydrocarbons include methane, ethane, propane, n-butane, isobutane, n-pentane, isopentane, neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures of citric acid and sodium bicarbonate such as the various products sold under the name Hydrocerol™ (a product of Boehringer Ingelheim). Any of the foregoing blowing agents may be used singly or in combination with one or more other blowing agents. Preferred blowing agents include isobutane, n-butane, carbon dioxide, HFC-152a, and mixtures of the foregoing.

The amount of blowing agent incorporated into the polymer melt material to make a foam-forming polymer gel is from 0.05 to 5.0, preferably from 0.2 to 3.0, and most preferably from 0.5 to 2.5 gram moles per kilogram of polymer.

A nucleating agent is optionally added to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. When used, the amount of nucleating agent employed advantageously ranges from about 0.01 to about 5 parts by weight per hundred parts by weight of a polymer resin.

In the manufacture of foams, a stability control agent (also known as permeability modifier) is optionally added to the present foam to enhance dimensional stability. Preferred agents include amides and esters of C10–24 fatty acids. Such agents are seen in U.S. Pat. Nos. 3,644,230 and 4,214,054. Esters may also reduce static during and after foam manufacture. Most preferred agents include stearyl stearamide, glycerol monostearate, glycerol monobehenate, and sorbitol monostearate. When used, such stability control agents are typically employed in an amount ranging from >0 to about 10 parts per hundred parts of the polymer.

Foams are optionally perforated to enhance or accelerate gaseous permeation exchange wherein blowing agent exits from the foam and air enters into the foam. U.S. Pat. Nos. 5,424,016, 5,585,058, WO 92/19439 and WO 97/22455, provide excellent information relative to perforation.

If desired, the foams of this invention may be post-treated by any known means to increase foam open cell content. Such post-treatment methods include, without limit, mechanically compressing the foam and expanding the foam by exposure to steam or hot air.

Foams of the present invention generally have a density of less than 700, preferably less than 500, more preferably less than 250 kg/m$^3$, and even more preferably less than 100 kg/m$^3$, most preferably from 5 to 70 kilograms per cubic meter (in accordance with ASTM D3575-93, Suffix W, Method B). The foams may be microcellular (i.e, with a cell size of from less than about 0.05 mm, preferably from about 0.001 mm, to about 0.05 mm) or macrocellular (i.e., cell size of about 0.05 mm or more). The macrocellular foam has an average cell size of from about 0.05 to about 15, preferably from about 0.1 to about 10.0, and more preferably from about 0.1 to about 5 millimeters, preferably from 0.2 to 2.0, and more preferably 0.2 to about 1.8 millimeters as measured according to the procedures of ASTM D3576-77. In general, the foams generally have an average cell size ranging from 0.001 to 10.0 mm.

Foams of the present invention preferably exhibit excellent dimensional stability. Preferred foams retain 80 or more percent of their initial volume when measured one month after an initial volume measurement within 30 seconds after foam expansion. Volume is measured by any suitable method such as cubic displacement of water.

The foams of the present invention have an open cell content that ranges from 0 to 100 volume percent based on the total volume of foam, as measured according to ASTM D2856-94, depending upon component selection and process condition variations. Foams with an open cell content of 20 vol percent or less generally fall in a class known as closed cell foams. Those known as open cell foams typically have an open cell content greater than 20, preferably greater than 40, and more preferably greater than 50 vol percent. The open cell content is desirably 100 vol percent or less, preferably 95 vol percent or less, and more preferably 90 vol percent or less.

The foams preferably have an Asker-C hardness of $\leq 80$, desirably $\leq 75$, and preferably $\leq 70$. Hardness measurements of the foams use an Asker C durometer for cellular rubber and yarn in accordance with ASTM D2240-97 measured in the extrusion direction, using a 5 mm diameter spherical indentor.

According to very preferred embodiments the foam comprises a rheology modified or coupled in-reactor propylene impact copolymer and has a density in the range of 50 kg/m$^3$ or less, and preferably 40 kg/m$^3$ or less, and has an Asker-C hardness of $\leq 35$ and more preferably $\leq 30$, as measured in the extrusion direction.

According to another very preferred embodiment, the foams of the present invention comprises a rheology modified or coupled in-reactor propylene impact copolymer and has a density in the range of 50 kg/m$^3$ or less, and preferably 40 kg/m$^3$ or less, and preferably has a Compression Strength as determined according to ASTM 3575 measured in the extrusion direction (in kPa (pounds per square inch, psi) for 25% compression) of ≦103 kPa (15 psi), more preferably ≦83 kPa (12 psi).

If the foam is in the shape of a sheet or plank, it has a thickness that is generally ≧0.5 mm, preferably ≧1 mm and a width that is generally ≧5 mm, preferably ≧10 mm. As used herein "thickness" of a foam plank or sheet refers to its smallest cross-sectional dimension (for example, as measured from one planar surface to an opposing planar surface). When the foam is present as a round or rod, it has a diameter that is generally ≧5 mm, preferably ≧10 mm.

The foams of the present invention may be used in any application where foams of comparable density and open or closed cell contents are used today. Such applications include, without limit, cushion packaging (for example, corner blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underlayment, sound insulation); flotation (for example, life jackets, vests and belts); sports and leisure (for example, gym mats and bodyboards); thermal insulation such as that used in building and construction); acoustical insulation (for example, for appliances and building and construction); gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad.

In another aspect, the polymer compositions of this invention may be used to make foamed films. The foamed film of the present invention may be a monolayer or a multilayer film. Preferably, the film according to the invention has a thickness of 0.0127–0.254 mm (0.5 to 10 mils). The film of the invention may be printed. Foamed film is especially suitable for use as label or in thermoformable articles of manufacture. To make foamed film structures, either physical or chemical blowing agents may be used. A multilayer film of the invention comprising one or more foamed layers comprising the polymer compositons as defined herein is obtainable according to methods known in the art, for example, using a co-extrusion process.

The label film may be constructed from printed, slit to width, rolls of film with the labels glued to a container, for example a bottle, using conventional adhesives and glues known to the industry. In addition, the films of this invention may be printed, coated with pressure sensitive adhesives, laminated to release papers or films and applied to bottles, containers or other surfaces by conventional pressure sensitive techniques.

The foregoing list merely illustrates a number of suitable applications. Skilled artisans can readily envision additional applications without departing from the scope or spirit of the present invention.

EXAMPLES

The following examples are to illustrate this invention and do not limit it. Ratios, parts, and percentages are by weight unless otherwise stated. For the examples below, unless otherwise indicated: melt flow rate (MFR) is measured in accordance with ASTM D 1238, at a temperature of 230° C. under a weight of 2.16 KG.

Dow Polypropylene C105-02, an in-reactor-produced propylene impact copolymer containing about 18 percent of units derived from ethylene and having an elastomer content of about 36 percent (ICP-1) was rheology modified with 225 ppm 4,4'-oxybis (benzenesulfonyl azide) to increase its melt strength, at the following conditions: barrel temperatures (°C.): 25, 189, 234, 240, 244, 244, 229, 240, die temperature: 246° C.; die pressure: 5012–5095 kPa (727–739 psi); melt temperature: 274 ° C.; screw RPM: 435; rate: 99.8 kg/h (220 lb/h). Comparisons were made with PROFAX* PF814 high melt strength PP (homopolymer). PROFAX is a trademark of Montell Company. The rheology modified ICP-1 (rICP-1) exhibited higher toughness and lower modulus compared to the PF814 PP.

Dow Polypropylene DS6D82, a propylene random copolymer containing about 3.2 percent of units derived from ethylene (RCP-1) was rheology modified with 900 ppm 4,4'-oxybis (benzenesulfonyl azide) at the following conditions: barrel temperatures (°C.): 27, 156, 210, 226, 230; die pressure: 1655 kPa (240 psi); melt temperature: 230° C.; screw RPM: 353; rate: 27.2 kg/h (60 lb/h) to give rRCP-1.

Dow Polypropylene 6D70K, a propylene random copolymer containing about 3.2 percent of units derived from ethylene (RCP-2) was rheology modified with 1000 ppm 4,4'-oxybis (benzenesulfonyl azide) at the following conditions: barrel temperatures (°C.): 27, 156, 215, 229, 233, die pressure: 1793 kPa (260 psi); screw RPM: 408; rate: 27.2 kg/h (60 lb/h) to give rRCP-2.

Dow Polypropylene C107-04, an in-reactor-produced propylene impact copolymer containing about 8 percent of units derived from ethylene and having an elastomer content of about 16 percent (ICP-2) was rheology modified with 200 ppm 4,4'-oxybis (benzenesulfonyl azide) at the following conditions: barrel temperatures (°C.): 25, 25, 17, 153, 200, 240, 260, 260, 260; die pressure: 2641–2910 kPa (383–422 psi); melt temperature: 250° C.; screw RPM: 220; rate: 59.0 kg/h (130 lb/h) to give rICP-2.

| Polymer Data: | PROFAX PF814 PP | rICP-1 | rICP-2 | rRCP-1 | rRCP-2 |
|---|---|---|---|---|---|
| Melt flow rate (dg/min) at 230° C. (ASTM-D1238) | 2.6 | 1.0 | 2.6 | 1.3 | 1.5 |
| Flex Mod. (MPa), 1% Secant at 20° C. (ASTM-D790, 0.05 in/min) | 1450 | 965 | 1377 | 707 | 1082 |
| Notched Izod Impact (23° C.), J/m (ASTM D256) | 48.0 | No Break | 699 (partial break) | 75.5 | 50.6 |
| Melt strength (cN) at 190° C. (Rheotens) | 46.5 | 9.0 | 8.6 | 20 | 42 |
| Melt drawability (mm/s) at 190° C. (Rheotens) | 43 | 60 | 96 | 50 | 23 |

Foam Preparation:

A tandem extrusion system consisting of a 34 mm diameter co-rotating twin-screw extruder (mixing extruder) feeding a 40 mm diameter single screw extruder (cooling extruder) was used for the production of the foam samples from PROFAX PF814 and and the rheology-modified propylene copolymers as described above. Polymer pellets were fed into the hopper of the twin-screw extruder. Blowing agent (BA) (isobutane) was injected in the twin-screw extruder. 0.25 weight percent talc was used as nucleator. The blowing agent laden polymer was compressed and then fed to the single screw extruder and cooled to an optimized temperature and then extruded through a 2 mm diameter rod die. The foaming conditions as well as the foam properties are incorporated in the tables below. C-1 to C-4 are comparative examples and Ex-1 to Ex-9 are inventive examples.

The rheology-modified propylene copolymers were successfully expanded to make low density foams. Stable foam was obtained at a BA level that could be increased from 8.2 up to 12.00 parts by weight. The rICP's resulted in significantly lower foam density, and a softer foam of smaller cell size as well as lower compression set. In addition the blowing efficiency (theoretical foam density if all blowing agent expanded divided by actual foam density multiplied by 100%) for the inventive foam was significantly higher than for the comparative foam (80 percent or more versus 72 percent). The rRCP resulted in significantly lower foam density, a softer foam, as well as a lower compression set, at an increased blowing efficiency compared to the comparative foam.

and units derived from ethylenically unsaturated comonomers and having a melt flow rate in the range of from 0.5 to 8 g/10 min, a melt strength of at least 5 cN, and a melt drawability of at least 20 mm/s, the foam having a density of 50 kg/m$^3$ or less, exhibiting an Asker-C hardness of 35 or less, and exhibiting a Compressive Strength of 103 kPa or less as determined in accordance with ASTM 3575 for twenty five percent compression.

2. A foam according to claim 1 wherein the propylene copolymer material has a melt flow rate in the range of from 0.6 to 5 g/10 min, a melt strength of at least 7 cN, and a melt drawability of at least 30 mm/s.

3. A foam according to claim 2 wherein the propylene copolymer material has a melt flow rate in the range of from 0.6 to 3.5 g/10 min, a melt strength of at least 10 cN, and a melt drawability of at least 40 mm/s.

4. A foam according to claim 1 wherein the ethylenically unsaturated comonomer of the propylene copolymer material is selected from the group consisting of ethylene, $C_4$–$C_{10}$ 1-olefins, and C4–C10 dienes.

5. A foam according to claim 1 wherein the propylene copolymer material comprises a propylene homopolymer or a random or block propylene copolymer as a continuous phase and an elastomeric phase uniformly dispersed therein.

TABLE 1A

| | | isobutane (phr) | foaming (° C.) | die pressure (kPa (psi)) | density (kg/m$^3$ (pcf)) | cell size X/Y/Z* (mm) | Open cells (vol. %) |
|---|---|---|---|---|---|---|---|
| C-1 | PF814 PP | 8.2 | 162.2 | 2544 (369) | 44.9 (2.8) | 2.71/2.45/1.57 | 0 |
| C-2 | PF814 PP | 8.2 | 157.0 | 2530 (367) | 46.5 (2.9) | — | 0 |
| C-3 | PF814 PP | 8.2 | 154.7 | 3372 (489) | 46.5 (2.9) | — | 0 |
| C-4 | PF814 PP | 8.2 | 152.1 | 3868 (561) | 44.9 (2.8) | 2.58/2.32/1.53 | 0 |
| Ex-1 | rICP-1 | 10.10 | 157.9 | 3413 (495) | 29.6 (1.85) | 1.16/1.36/0.89 | 34 |
| Ex-2 | rICP-1 | 10.10 | 156.0 | 4482 (650) | 30.0 (1.87) | 0.92/0.99/0.79 | 30 |
| Ex-3 | rICP-1 | 12.00 | 155.1 | 5171 (750) | 24.3 (1.52) | 0.82/0.89/0.70 | 0 |
| Ex-4 | rICP-2 | 8.15 | 159.6 | 3020 (438) | 35.9 (2.24) | 1.95/2.45/1.80 | 44 |
| Ex-5 | rICP-2 | 8.15 | 156.6 | 5164 (749) | 31.2 (1.95) | 1.88/1.80/1.16 | 23 |
| Ex-6 | rRCP-1 | 10 | 137.5 | 3330 (483) | 30.3 (1.89) | 2.45/2.58/1.68 | 0 |
| Ex-7 | rRCP-1 | 10 | 136.0 | 3551 (515) | 28.4 (1.77) | 2.45/2.71/1.41 | 0 |
| Ex-8 | rRCP-2 | 10 | 145.1 | 3523 (511) | 33.2 (2.07) | 2.35/2.22/1.43 | 0 |
| Ex-9 | rRCP-2 | 12 | 142.9 | 2248 (326) | 25.0 (1.56) | 2.03/2.22/1.52 | 0 |

*Cell size: X/Y/Z direction according to ASTM 3576, wherein Z is the machine direction and X and Y are perpendicular to the machine direction.

TABLE 1B

| | | comp. set** (%) | comp. Strength*** (kPa (psi)) | Asker C (cross/machine/average) |
|---|---|---|---|---|
| C-1 | PF814 PP | 17.8 (± 2.1) | 194.4 (28.2) | 50.3/46.3/48.3 |
| C-4 | PF814 PP | 16.3 (± 1.9) | 155.8 (22.6) | 44.5/40.3/42.4 |
| Ex-1 | rICP-1 | 17.1 (± 1.1) | 64.8 (9.4) | 26.3/20.7/23.5 |
| Ex-2 | rICP-1 | 12.4 (± 1.1) | 73.8 (10.7) | 27.5/23.7/25.6 |
| Ex-3 | rICP-1 | 13.5 (2.3) | 76.5 (11.1) | 27.5/20.7/24.1 |
| Ex-4 | rICP-2 | 15.1 (± 0.5) | 104.1 (15.1) | 25.7/24.3/25.0 |
| Ex-5 | rICP-2 | 12.7 (± 0.6) | 82.0 (11.9) | 28.0/25.7/26.8 |
| Ex-6 | rRCP-1 | 7.2 (± 0.8) | 55.2 (8.0) | 26.7/18.3/22.5 |
| Ex-7 | rRCP-1 | 6.5 (± 1.1) | 49.0 (7.1) | 27.0/17.7/22.3 |
| Ex-8 | rRCP-2 | 9.2 (± 0.5) | 74.5 (10.8) | 32.3/25.0/28.7 |
| Ex-9 | rRCP-2 | 10.2 (± 0.3) | 76.5 (11.1) | 27.7/25.0/26.3 |

**Compression Set: ASTM 3575 @ 75% compression for 22 hours followed by 24 hours recovery
***Compressive Strength: ASTM 3575 (kPa (psi) for 25% compression)

What is claimed is:

1. A foam comprising a propylene copolymer material comprising at least 50 weight percent of units derived from propylene, based on the total propylene copolymer material, 6. A foam according to claim 1 where the propylene copolymer material comprises a propylene random copolymer.

7. A foam according to claim 5 wherein the propylene copolymer material is a rheology modified propylene copolymer material.

8. A foam according to claim 6 wherein the propylene random copolymer is a rheology modified propylene random copolymer.

9. A foam according to claim 1 having a density in the range of 5 to 50 kg/m$^3$.

10. Article comprising a foam in accordance with claim 1.

11. A process for making a foam, which process comprises converting a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, into a polymer melt, introducing, at an elevated pressure, at least one blowing agent into the polymer melt to form a foamable gel, cooling the foamable gel, and extruding the foamable gel into a region of lower pressure to form a foam, the foam having a density of 50 kg/m³ or less, exhibiting an Asker-C hardness of 35 or less, and exhibiting a Compressive Strength of 103 kPa or less as determined in accordance with ASTM 3575 for twenty five percent compression.

12. A process for making a foam in the form of thermoplastic foam beads, which process comprises converting a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, into a polymer melt, cooling and granulating the polymer melt to form discrete resin particles, creating a suspension by dispersing the resin particles in a liquid medium in which they are substantially insoluble, introducing, at an elevated temperature and pressure, at least one blowing agent into the suspension to form resin particles having a blowing agent incorporated therein, and rapidly discharging the product into an atmosphere that promotes converting the product into foam beads, the foam having a density of 50 kg/m³ or less, exhibiting an Asker-C hardness of 35 or less, and exhibiting a Compressive Strength of 103 kPa or less as determined in accordance with ASTM 3575 for twenty five percent compression.

13. Expandable composition comprising a propylene copolymer material comprising at least 50 weight percent of units derived from propylene, based on the total propylene copolymer material, and units derived from ethylenically unsaturated comonomers and having a melt flow rate in the range of from 0.5 to 8 g/10 min, a melt strength of at least 5 cN, and a melt drawability of at least 20 mm/s, optionally mixed with a nucleating agent, and a blowing agent, the expandable composition being capable of forming a foam having a density of 50 kg/m³ or less, exhibiting an Asker-C hardness of 35 or less, and exhibitiny a Compressive Strength of 103 kPa or less as determined in accordance with ASTM 3575 for twenty five percent compression.

* * * * *